UNITED STATES PATENT OFFICE.

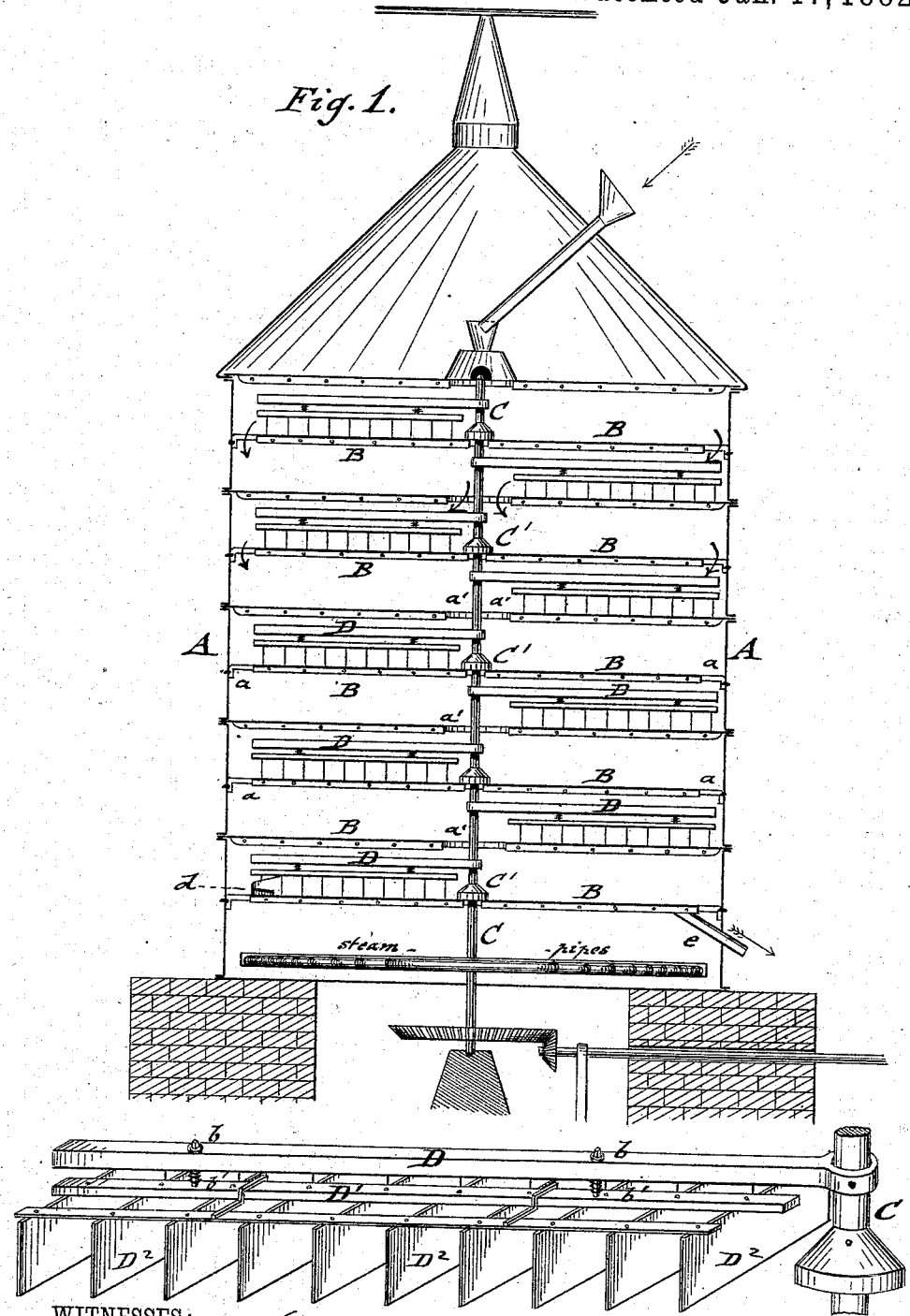

WILLIAM A. DIESELDORFF, OF COBAN, GUATEMALA.

APPARATUS FOR DRYING COFFEE-BEANS.

SPECIFICATION forming part of Letters Patent No. 252,439, dated January 17, 1882.

Application filed August 16, 1881. (No model.)

*To all whom it may concern:*

Be it known that I, WILLIAM A. DIESELDORFF, of Coban, in the Republic of Guatemala, have invented certain new and useful Improvements in Apparatus for Drying Coffee-Beans, of which the following is a specification.

In drying coffee-beans it is of the greatest importance to expose them to a uniform continuous heat throughout the drying process and to complete the same within a reasonable time, so as to handle considerable quantities of coffee at the least possible expense. Various constructions of drying apparatus have been proposed for this purpose, without, however, meeting all the requirements and without giving perfect satisfaction.

The object of my invention is to furnish a coffee-drying apparatus in which the operation of drying is performed continuously in a very effective and uniform manner; and the invention consists of a cylindrical casing heated by a steam coil or otherwise, and provided with horizontal interior shelves, which are arranged alternately with circumferential and central channels for the passage of the beans and the heated air, in combination with a central revolving shaft carrying radial stirrer-arms with inclined and spring-cushioned stirrer-blades, and a hook-shaped rake for the final delivery of the coffee-beans to the discharge-pipe. The stirrer-shaft has fixed central stop-disks, which are beveled at the top to close the central opening of the shelves, which have a circumferentially-arranged channel. The outermost stirrer-blade of the lowermost arm is provided with a hook-shaped rake for delivering the beans to the discharge-channel. The inclined stirrer-blades are applied to an auxiliary arm, which is connected by fixed bolts and cushioning-springs with the radial main arm of the stirrer-shaft.

In the accompanying drawings, Figure 1 represents a vertical central section of my improved apparatus for drying coffee-beans, and Fig. 2 is a detail perspective view of one of the revolving stirrers.

Similar letters of reference indicate corresponding parts.

Referring to the drawings, A represents the outer cylindrical casing of my improved apparatus, which casing is made of sheet metal of suitable strength, and is provided with a conical top or hood, at the apex of which may be arranged a steam or other suitable exhausting apparatus (not shown in the drawings) that serves to draw off the evaporation of the beans.

At the interior of the casing A are arranged a series of shelves, B, which are firmly connected to the casing in such a manner that they form, with the same, alternately circumferential or central passages or openings $a$ and $a'$ for the passage of the beans from one shelf to the other. The beans are fed to the apparatus at the top through a hopper and a conducting-channel, and are dropped onto the central part of the uppermost shelf, which is provided with a circumferential channel.

A revolving stirrer-shaft, C, is arranged at the center of the apparatus and supported on a suitable step-bearing outside of and below the bottom of the casing, and by a top bearing above the uppermost shelf, the shaft C passing through the center openings of one set of shelves, B, and through the central channels, $a$, of the other alternating set. The shaft C carries above each shelf a radial stirrer-arm, D, which is rigidly secured thereto. To each stirrer-arm is hung, by fixed screw-bolts $b$, an auxiliary arm, D′, parallel thereto, between which and the main arm are interposed spiral cushioning-springs $b'$, as shown in Fig. 2.

To the auxiliary arm D′ are applied inclined blades D², which serve to rake up the beans, the blades being preferably arranged at an angle of sixty degrees to the stirrer-arms, so that the beans are gradually pushed from the center of the shelf to the outer edge thereof, there dropped through the channel $a'$ to the next shelf B, and then moved toward the center by the next stirrer, the blades of which are set at an inward angle of inclination. The beans are then dropped through the center passage of the second shelf onto the third shelf, and so on.

The cushioning-springs of the stirrer-blades serve the purpose of permitting the blades to pass over obstructions—such as stones, nails, or other bodies which may be fed with the beans to the apparatus—without producing the stoppage of the entire apparatus.

The stirrer-shaft C is provided above the central openings arranged in every alternate shelf for the passage of the shaft with stop-disks C′, which are conically beveled at their upper surfaces, so as to shed the beans as they are dropped from one shelf onto the shelf next below. The disks C' have flat bottoms, so as to bear tightly upon the shelves and close the openings for the shaft, so as to prevent the passage of the heated air and of beans through these openings.

Revolving motion is imparted to the stirrer-shaft by a suitable transmitting-gear and motive power outside of the apparatus. When the beans have been gradually fed over all the shelves of the apparatus, and are thoroughly dried by the contact with the heated air, which passes in a counter current over the same, they are finally taken up at the outer circumference of the lowermost shelf by means of a hook-shaped rake, $d$, of the outermost stirrer-blade, and finally delivered thereby to the discharge-channel $e$, and thence to the outside into suitable receptacles for being packed.

The heat is preferably obtained by a coil of steam-pipes near the bottom of the apparatus, or from a separate furnace, as desired.

The construction of the apparatus admits of the continuity of the drying process, during which the beans are exposed to the hot air passing over them, so that they give off their moisture and are dried in a uniform and effective manner.

The apparatus is also adapted for drying grain which has become moist in transit.

Having thus described my invention, I claim as new and desire to secure by Letters Patent—

1. In a coffee-drying apparatus, a closed cylinder provided with a series of interior shelves having alternate central and circumferential passages, the stirring mechanism composed of a main radial arm, an auxiliary arm, connecting screw-bolts and springs, inclined stirrer-blades, and main shaft, in combination with the rake and means for heating, substantially as described.

2. In a coffee-drying apparatus, a closed cylinder provided with a series of interior shelves having alternate central and circumferential passages, in combination with the stirring mechanism $D\ D'\ D^2\ b\ b'$ and shaft C, substantially as described.

3. In a coffee-drier, the combination, with the cylinder and shelves, of the stirring mechanism, the conical stop-disks, means for heating, rake-hook $d$, and discharge pipe, substantially as described.

In testimony that I claim the foregoing as my invention I have signed my name, in presence of two witnesses, this 15th day of August, 1881.

WILLIAM A. DIESELDORFF.

Witnesses:
O. V. NOS SITZ,
PAUL GOEPEL.